United States Patent Office 3,077,220
Patented Feb. 12, 1963

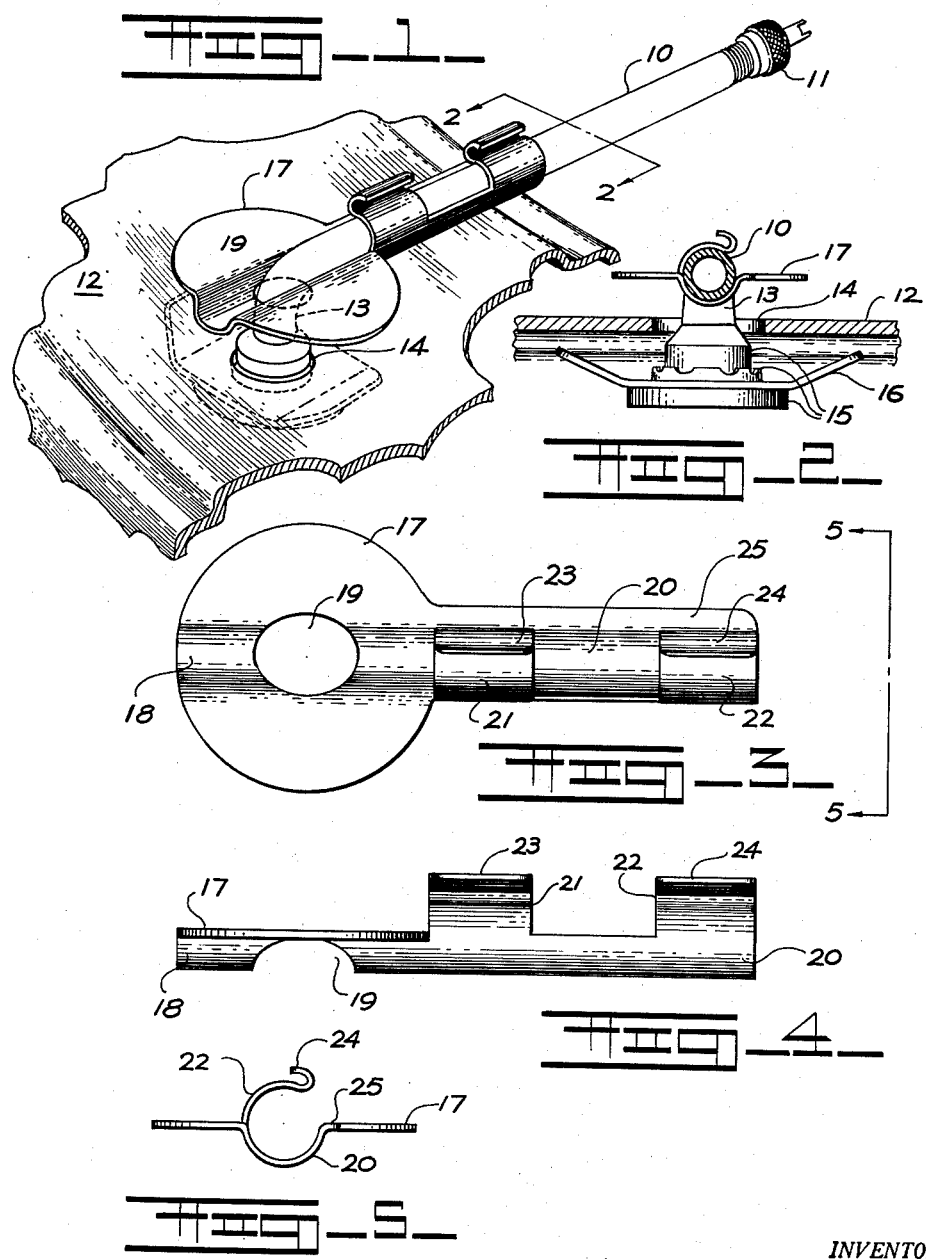

3,077,220
VALVE STEM CLIP
Andrew Fusco, Jr., 52 Winchester St.,
Youngstown, Ohio
Filed May 25, 1961, Ser. No. 112,649
2 Claims. (Cl. 152—427)

This invention relates to a valve stem clip for a pneumatic tire and more particularly to a clip-on device adapted to hold a valve stem in normal extended external relation to a tire and wheel when the tire is deflated.

The principal object of the invention is the provision of a valve stem clip which may be quickly and easily applied to a valve stem and will hold the valve stem in normal extended relation to a wheel and tire.

A further object of the invention is the provision of a simple, inexpensive device that may be positioned on a tire valve stem to prevent it from moving inwardly of the wheel opening through which it is positioned.

A further object of the invention is the provision of a device that may be installed on various pneumatic tires and wheels to engage the valve stem and hold it in fixed position relative to the wheel and tire.

The valve stem clip disclosed herein provides a convenient and practical means of holding the valve stem of a pneumatic tire and tube in proper position on the rim or wheel on which the tire is mounted to prevent the same from moving inwardly of the wheel or rim when the tire is deflated and damaging the tire and the tube. In truck tires and particularly where dual wheels are used it has become a common occurrence to find that a tire has been deflated by puncture or otherwise while an adjacent tire remains inflated with the result that the truck or other vehicle is driven and the rotating action of the wheel and deflated tire pulls the valve stem inwardly of the wheel or rim on which the tire is mounted so that the valve stem moves about within the area of the tire and severly damages the tire and the tube. It is obvious that if the valve stem is prevented from moving into the tire, it cannot damage the tire or the tube and the present invention provides a practical and efficient means for insuring against such movement. The valve stem clip herein disclosed permits such movement as is necessary on the part of the valve stem while at the same time preventing the degree of movement which would result in damage to the tire and tube.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of a valve stem and a portion of a rim showing the valve stem clip applied thereto.

FIGURE 2 is an end view on line 2—2 of FIGURE 1.

FIGURE 3 is an enlarged top plan view of the valve clip.

FIGURE 4 is a side view of the clip shown in FIGURE 3.

FIGURE 5 is an end view on line 5—5 of FIGURE 3.

By referring to the drawings and FIGURE 1 in particular, it will be seen that a valve stem 10 is provided on its outermost end with a cap 11 which extends substantially horizontally with respect to a portion of a rim 12 which may be a separate rim or the rim portion of a wheel of a truck or the like. The valve stem 10 has a right angular bend adjacent its innermost end with a vertically positioned portion 13 extending downwardly through an opening 14 in the rim 12 where the portion 13 of the stem 10 enlarges as at 15, see FIGURE 2. The enlarged portion 15 of the stem is secured to an apertured bracket 16 in clamping relation in an opening in an inner tube as will be understood by those skilled in the art. In order to prevent the valve stem 10 from moving downwardly through the opening 14 in the rim 12, which will occur when the inner tube is deflated, a clip is affixed to the horizontal portion of the valve stem 10 as seen in FIGURES 1 and 2 of the drawings. The clip comprises a sheet metal blank having a circular end section 17 with a transversely extending shallow groove 18 therein and an opening 19 centrally thereof. The remainder of the blank is substantially rectangular and forms an elongated portion 20 arcuate in cross section to conform with the shape of the groove 18 and the elongated portion 20 has a pair of spaced semicircular sections 21 and 22 which continue on the radius of the arcuate section thereof upwardly and substantially over the arcuate section and have their upper ends 23 and 24 turned backwardly upon themselves. In FIGURES 3, 4 and 5 enlarged detailed views of the clip may be seen and it will be observed that the elongated portion 20 has a longitudinally extending flange 25 along one edge thereof which stiffens this portion of the clip. It will also be seen that when the clip is positioned with the opening 19 over the valve stem 10 and moved along the same until the circular end portion 17 registers about the portion 13 of the valve stem 10 the upwardly extending sections 21 and 22 may then be engaged in a spring-like fashion over the horizontal portion of the valve stem 10 due to the resiliency of the metal from which the device is formed. The uppermost parts of the sections 21 and 22 overlie the upper surface of the valve stem 10 and hold the clip securely thereto so that the circular portion 17 of the clip which is positioned around the vertical section 13 of the stem 10 prevents the same from moving downwardly into the opening 14 in the rim 12. It will also be observed by those skilled in the art that in order to position the valve stem clip on a valve stem it is necessary to hold the clip vertically to permit the opening 19 to engage the horizontal portion of the stem 10 whereupon the clip may be moved inwardly of the same until it reaches the right angular portion and then swung in a 160° arc to bring the sections 21 and 22 into engagement with the horizontal portion of the stem and thereby be secured thereto. In such position, as shown in FIGURES 1 and 2, any tendency of the stem to move inwardly of the opening 14 in the rim 12 is opposed by the circular portion 17 of the clip, a portion of which now underlies the adjacent horizontal portion of the valve stem 10. The circular portion 17 of the clip is prevented from tilting by engagement of the sections 21 and 22 over the horizontal portion of the valve stem 10.

It will thus be seen that a simple and efficient valve stem clip has been disclosed which may be simply and economically formed of a simple piece of sheet metal and applied to a valve stem quickly and easily and which will retain itself in a portion on the valve stem and prevent the valve stem from moving through the opening in the rim and into the tire and thereby avoids damaging the same and having thus described my invention, what I claim is:

1. The combination of a valve stem having a right angular bend therein adjacent one end thereof on an inner tube in an inflatable tire on a rim and positioned through an opening in said rim, and a clip for holding said valve stem relative to said rim, said clip comprising an elongated member having a transversely arcuate cross section, an opening in said clip adjacent one end for receiving said valve stem and spaced upwardly curving sections on said clip overlying the elongated member for snap-like registry with said valve stem and an annular flange around said opening.

2. The combination of a clip and a valve stem having a right angular bend adjacent one end, said clip comprising an elongated portion having a circular end section, a longitudinally extending groove in said elongated portion and across said circular end, said circular end having an opening centrally thereof, a longitudinal flange on said elongated portion and a pair of spaced opposited disposed upwardly curving clamping sections on said elongated portion, the outermost ends of which are turned backwardly upon themselves and overlying said elongated section and said curve therein and engaging one portion of said valve stem when another portion thereof is engaged in said opening.

References Cited in the file of this patent

UNITED STATES PATENTS

| | | |
|---|---|---|
| 2,523,785 | Sereno | Sept. 26, 1950 |
| 2,968,691 | Canfield | Jan. 17, 1961 |
| 2,984,283 | Ransom | May 16, 1961 |
| 3,039,510 | Cardi | June 19, 1962 |

FOREIGN PATENTS

| | | |
|---|---|---|
| 100,007 | Great Britain | Jan. 4, 1917 |

OTHER REFERENCES

SAV–A–TIR advertisement (T.M. registration 663,662), July 22, 1957.